United States Patent
Hall et al.

Patent Number: 5,891,947
Date of Patent: *Apr. 6, 1999

[54] IN-SITU ANIONIC CONTINUOUS DISPERSION POLYMERIZATION PROCESS

[75] Inventors: James E. Hall, Mogadore; David M. Roggeman, North Royalton, both of Ohio

[73] Assignee: Bridgestone Corporation, Tokyo, Japan

[*] Notice: The portion of the term of this patent subsequent to Jul. 19, 2011, has been disclaimed.

[21] Appl. No.: 137,332

[22] Filed: Oct. 18, 1993

Related U.S. Application Data

[63] Continuation-in-part of Ser. No. 995,118, Dec. 22, 1992, Pat. No. 5,331,035.

[51] Int. Cl.$^6$ ........................................... C08K 3/20
[52] U.S. Cl. ..................... 524/457; 524/461; 526/201
[58] Field of Search ................... 524/457, 461; 526/201

[56] References Cited

U.S. PATENT DOCUMENTS

| | | | |
|---|---|---|---|
| 4,098,980 | 7/1978 | Markle et al. | 526/201 |
| 4,829,135 | 5/1989 | Gunesin et al. | 526/173 |

*Primary Examiner*—Peter D. Mulcahy
*Attorney, Agent, or Firm*—Frank J. Troy, Sr.

[57] ABSTRACT

The present invention relates to a process for the dispersion copolymerization of 35 to 70% by weight of vinyl substituted aromatic monomer and 30 to 65% by weight of conjugated diene monomer comprising carrying out the copolymerization in a reaction mixture containing a liquid aliphatic hydrocarbon dispersing medium, an anionic catalyst system, and an "A" block of a copolymer dispersing agent, the dispersing agent having at least two polymer blocks wherein at least one of the polymer blocks is soluble in the dispersing medium and at least another of the polymer blocks is insoluble in the dispersing medium and is formed in situ.

20 Claims, 1 Drawing Sheet

IN-SITU ANIONIC CONTINUOUS DISPERSION POLYMERIZATION PROCESS

CROSS REFERENCE TO RELATED APPLICATION

This application is a continuation-in-part of application Ser. No. 07/995,118, filed Dec. 22, 1992, U.S. Pat. No. 5,331,035, the disclosure of which is incorporated herein by reference.

FIELD OF THE INVENTION

The present invention relates to an anionic styrene-butadiene type rubber polymerization process conducted in a non-aqueous dispersion utilizing butadiene-type and styrene-type monomers and a dispersing agent formed in-situ during a continuous polymerization process.

BACKGROUND OF THE INVENTION

In many prior art non-aqueous dispersion polymerization systems, an organic dispersing medium has been utilized having poor solvent properties for the polymer being produced. A dispersing agent was therefore utilized in the organic medium in order to disperse the polymer being formed throughout the medium. These dispersing agents or dispersants were generally polymeric materials such as block copolymers, random copolymers, or homopolymers as described in U.S. Pat. Nos. 4,098,980 and 4,452,960.

Styrene-butadiene rubbers (SBR) have generally been prepared in solvents in which SBR is soluble, however, only SBR's having a styrene content of less than 35% are soluble in hexane or other aliphatic solvents. These higher styrene content SBR polymers are not completely insoluble in the aliphatic solvents, and, in fact, are highly swollen in these solvents. However, SBR's having a styrene content greater than 35% necessarily have been polymerized in aromatic or cycloaliphatic solvents via solution polymerization.

The applicant first determined that certain pre-made dispersing agents can be utilized to conduct the non-aqueous dispersion polymerization production of SBR having a styrene content greater than 35% by weight in aliphatic dispersing medium such as hexane. Although the dispersion process using a pre-made dispersant works well, it has one shortcoming from a practical or commercial scale up point of view. The dispersant must be prepared separately and stored for subsequent use in the polymerization process. Storage tank and transfer lines require a large capital expenditure and the synthesis of the dispersant and transfer time into the polymerization reactor results in higher production costs.

In these first dispersion SBR studies, a single diblock polymer consisting of a short block (5%–10% of total polymer) of hexane soluble polybutadiene and a long block (90%–95% of total) of high styrene content SBR was prepared in the absence of a dispersing agent. Synthesis of this polymer structure in hexane resulted in either extremely viscous cements or the very undesirable phase separation.

It is therefore desirable to provide a continuous dispersion polymerization process in which there is no need to store the dispersing agent prior to the commencement of the dispersion polymerization process.

It is an object of the present invention to provide a continuous polymerization process employing an anionic initiation system to polymerize styrene and butadiene monomers in a non-aqueous dispersion into SBR having 35 to 70% by weight of styrene. Polymerization is conducted in the presence of a dispersing agent that is continuously prepared in-situ, that is, during the continuous polymerization reaction.

Such a continuous non-aqueous dispersion polymerization process offers many advantages including improved stable dispersions, improved heat transfer, energy savings, high polymer concentrations in the reaction medium, increased production capacity, and the production of very high molecular weight polymers; and no need to store the dispersing agent prior to its use.

SUMMARY OF THE INVENTION

In accordance with the present invention, a continuous polymerization process is provided for the preparation of a rubbery copolymer by the non-aqueous dispersion random polymerization of a mixture of 30 to 65% by weight of a conjugated diolefin monomer, preferably butadiene, and 35 to 70% by weight of a vinyl substituted aromatic monomer, preferably styrene, in a liquid aliphatic hydrocarbon dispersion medium with an anionic initiator catalyst system in the presence of a block copolymeric dispersing agent which is continuously prepared in-situ. At least one block of the dispersing agent is continuously prepared prior to the dispersion polymerization reaction and a second block of the dispersing agent and a rubbery copolymer are continuously prepared in-situ during the dispersion copolymerization. The second block of the dispersing agent has the polymer structure of the continuously produced rubbery copolymer.

DETAILED DESCRIPTION OF THE INVENTION

Figure 1:
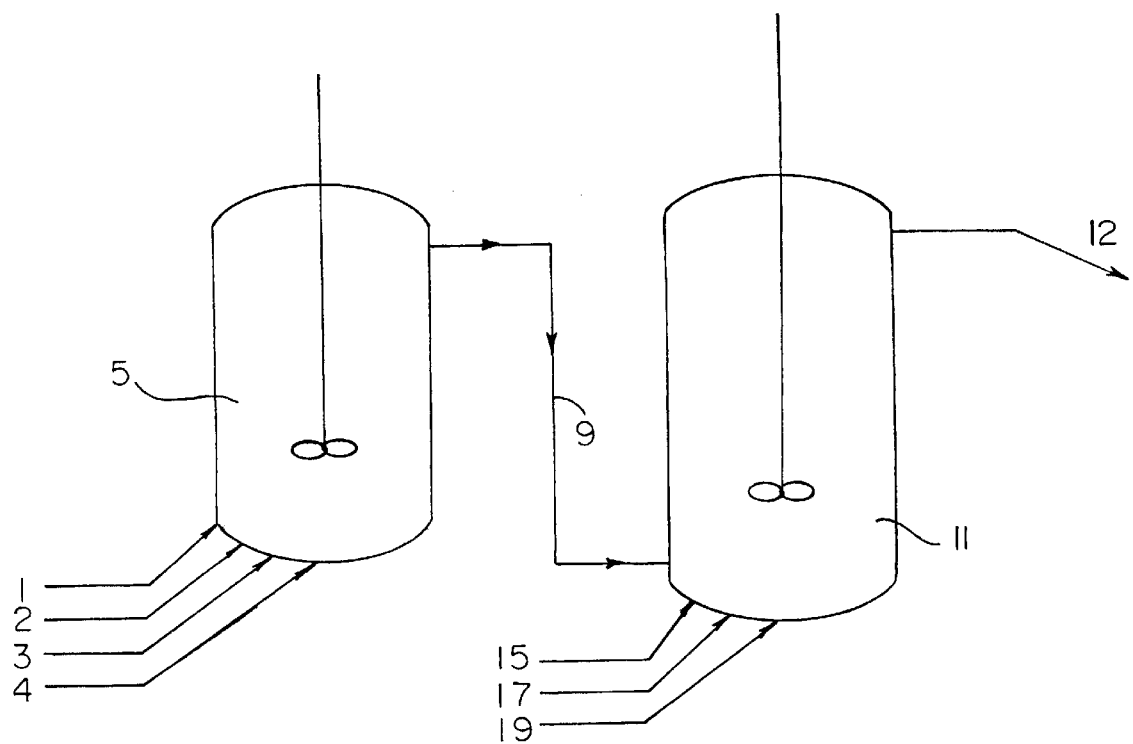

The copolymer rubbers prepared by the process of the instant invention are copolymers formed by the continuous copolymerization of at least one conjugated diene monomer and at least one vinyl substituted aromatic monomer. A random copolymer is defined as a copolymer of a diene monomer and a vinyl aromatic monomer (VAM) in which no more than 5% by weight of the copolymer is composed of VAM blocks of 10 or more VAM units. Preferably, no more than 5% by weight of the VAM is contained in blocks of 10 or more VAM units. Most preferably, 100% of VAM units are in blocks of less than 10 VAM units and 80% of VAM units are in blocks of less than 5 VAM units. This definition applies to polymers having less than 50% by weight of styrene content. Somewhat higher levels can be tolerated at 50–70% styrene levels in SBR.

The conjugated diene monomers utilized in the synthesis of such copolymer rubbers generally contain from 4 to 12 carbon atoms. Diene monomers containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Vinyl substituted aromatic hydrocarbon monomers, also referred as vinyl aromatic monomers suitable for use in preparing the random copolymers of this invention include any vinyl or alphamethyl vinyl aromatic compounds capable of being polymerized by an anionic initiator. Particularly useful monomers for this purpose are vinyl aryl and alphamethyl-vinyl aryl compounds such as styrene, alphamethyl styrene, vinyl toluene, vinyl naphthalene, alphamethylvinyl toluene, vinyl diphenyl, and corresponding compounds in which the aromatic nucleus may have other alkyl derivatives up to a total of 8 carbon atoms. Certain vinyl substituted aromatic monomers are not suitable for use in this dispersion polymerization process because homopolymers of these monomers are soluble in linear alkane solvents such as hexane and their copolymers with diene are also soluble. A specific example of an unsuitable monomer type is t-butyl styrene.

The preferred comonomers for use in the process of the present invention are styrene and butadiene for production of a SBR product. In the production of the random copolymers of the present invention, the vinyl substituted aromatic monomer contributed content ranges from 35 to 70 parts by weight (pbw), preferably 40 to 60 parts by weight, and the diene monomer contributed content ranges from 30 to 65 parts by weight, preferably 40 to 60 parts by weight.

The copolymers produced by the process of the present invention can be prepared from any combination of each of the aforementioned conjugated diene and vinyl aromatic monomers. While the following discussion relates to the production of randomized styrene-butadiene rubbers (SBR) from styrene and butadiene monomers, it is apparent that this discussion encompasses the use of any combination of the above-identified vinyl-substituted aromatic hydrocarbons and conjugated dienes. The SBR-type copolymers prepared by the process of the present invention have an average molecular weight of 20,000–2,500,000 preferably 75,000–500,000 as determined by Gel Permeation Chromatography (GPC). In addition to the ability to make high molecular weight polymers possessing good hot tensile strength, these copolymers have good oil acceptance or extendibility, modulus, tensile strength and stability against heat and aging. These copolymers are especially useful in the production of high performance tires.

The solvents, also known as the dispersing medium, used in the present polymerization process are aliphatic hydrocarbons, preferably linear aliphatic hydrocarbons, including butane, pentane, hexane, heptane, isopentane, octane, isooctane, nonane, and the like and mixtures thereof. Solvents are employed within such a range as being necessary to maintain a dispersion state in said solvent and for properly controlling stability of a polymer dispersion. The insolubility of SBR in a solvent is a function of molecular weight of the polymer, temperature, and the solubility parameter, which is the square root of the cohesive energy density, that is;

$$\text{solubility parameter}(s.p.) = \sqrt{\Delta E/V}$$

wherein E is internal energy and V is the molar volume. For polymers it is often best to calculate s.p. as displayed in the article "A Method for Estimating the Solubility Parameters and Molar Volumes of Liquids" in *Polymer Engineering & Science*, vol.14, no. 2, pp 147–154 (1974). The calculated s.p. is 8.6 for polybutadiene, 9.2 for SBR having a 35% styrene content, and 10.5 for polystyrene. The s.p. of n-hexane is 7.3 and a 35% styrene SBR has only partial solubility in n-hexane. The solubility parameter (s.p.) of SBR or other random copolymer produced by the present invention must be at least 1.9 greater than the s.p. of the solvent or dispersing medium, so that the SBR is not completely soluble in the dispersing medium and can thus form an acceptable dispersion. The aliphatic hydrocarbon is used as the solvent to disperse the mixture of copolymers into fine particles.

The preferred solvent for use as a dispersing medium in the present process is n-hexane. While the solvent may consist of up to 100% of non-cyclic or linear aliphatic hydrocarbons, preferably up to 70% of non-cyclic or linear aliphatic hydrocarbons, up to 30% by weight of the total solvent can be provided by at least one alicyclic hydrocarbon such as cyclopentane, methylcyclopentane, cyclohexane, methylcyclohexane and aromatic hydrocarbons such as benzene and toluene. A higher percentage of VAM units in the SBR allows for a higher percentage of non-aliphatic linear hydrocarbons to be present in a solvent mixture. However, for a SBR with approximately 38 to 42 pbw styrene content, no more than 5% of the solvent should consist of an alicyclic hydrocarbon such as cyclohexane, for example. The random copolymer product contains 10 to 50 weight percent solids relative to the liquid hydrocarbon dispersing medium to yield a fluid polymer dispersion which can be easily handled.

The continuous copolymerization process of the present invention is performed in a non-aqueous dispersing medium in the presence of an anionic initiator catalyst system and a block copolymer dispersing agent that is prepared in-situ during the copolymerization process. The block copolymer dispersing agents useful in the present invention are polyblock copolymers, in that they are selected from a variety of polymers containing at least two blocks linked by chemical valences wherein at least one of said blocks ("A" block) is soluble in the dispersion medium and at least another of said blocks ("B" block) is insoluble in the dispersion medium. The dispersing agent acts to disperse copolymers hereinafter identified as 'C' copolymers or the rubber copolymer, formed from conjugated dienes and vinyl aromatic monomers which are formed in the presence of the dispersing agent. The insoluble "B" block provides an anchor segment for attachment to the 'C' copolymer, i.e. the SBR polymer. The soluble "A" block of the dispersing agent provides a sheath around the otherwise insoluble copolymer and maintains the copolymeric product as numerous small discrete particles rather than an agglomerated or highly coalesced mass. The insoluble "B" block may, if desired, contain a plurality of pendent groups.

The soluble "A" block or first block of the dispersing agent comprises about 2 to about 20 percent by weight of the total dispersion copolymer including the dispersing agent and the 'C' copolymer, i.e., the SBR-type random copolymer. The insoluble "B" block or second block of the dispersing agent is prepared in-situ during the continuous polymerization of the SBR-type random copolymer, therefore the "B" block has the same composition as the 'C' copolymers, namely the SBR-type random copolymer formed during the dispersion copolymerization process. The total dispersion copolymer composition preferably contains about 2 to about 10 percent by weight of the soluble "A" block and about 90 to about 98 percent by weight of the insoluble "B" block and 'C' copolymers, most preferably from 4 to 8 weight percent of "A" and 92 to about 96 percent by weight of "B" block and 'C' copolymers being most preferred. The number average molecular weights $M_n$ of each "A" block is preferably at least 500 and a maximum of 200,000, most preferably 1,000 to 100,000.

The number average molecular weights of each "B" block is the same as the 'C' copolymers or SBR-type random polymer, namely at least 20,000 and a maximum of 2,500,000, preferably 75,000 to 500,000.

While it is believed that the soluble "A" can be prepared from any monomer providing a soluble block in the dispersing medium subject to known anionic polymerization constraints, it is preferred that the soluble "A" block be selected from a polymer formed by polymerization of conjugated diene monomers or be selected from a copolymer formed by copolymerization of conjugated diene monomers and vinyl substituted aromatic monomers as previously defined. The soluble "A" block is most preferably selected from a polymer or a copolymer formed from 75 to 100 parts by weight, preferably 75 to 98 parts of conjugated diene monomer contributed units and 0 to 25 parts by weight, preferably 2 to 25 parts, of vinyl substituted aromatic monomer contributed units with all polymer or copolymer blocks being soluble in the hydrocarbon dispersion medium.

The insoluble "B" block is produced in the dispersion polymerization process during the formation of the random copolymer having the same composition as the random copolymer. The insoluble "B" block is anchored to the surface of or the outer layer of the copolymer particle by physical adsorption processes, as for example, by van der Waals forces. Therefore, its main criteria for success as an anchor is to be relatively immiscible in the dispersing medium. The "B" block can be prepared by the copolymerization of 30 to 65 parts by weight of conjugated diene monomer contributed units and 35 to 70 parts by weight of vinyl substituted aromatic monomer contributed units.

The preferred dispersing agents, prepared in-situ for use in the present process can be represented by the following structural formula:

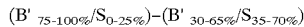

$(B'_{75-100\%}/S_{0-25\%})-(B'_{30-65\%}/S_{35-70\%})$ wherein B' represents butadiene monomer units and S represents styrene monomer units, all blocks of (B'/S) are randomized copolymers of butadiene and styrene monomers. The subscripts display the possible percentage by weight of each monomer in the blocks. Most preferred diene/vinyl aromatic block copolymers having (1) a first block "A" formed from polybutadiene or by the random copolymerization of styrene/butadiene to form an SBR block having less than 25% by weight of styrene contributed content, and (2) a second block "B" formed from a randomized copolymer of styrene/butadiene having a styrene contributed content comparable with the SBR copolymer to be made by the process of the present invention, namely in the range from 35% to 70% by weight of styrene and 30% to 65% by weight of butadiene.

Diblock A-B dispersing agents are typically prepared utilizing monolithium anionic initiators. The use of dilithium anionic initiators promotes the production of triblock B-A-B' dispersing agents. The dispersing agents prepared in-situ and used in the preparation of the SBR copolymers are recovered as a blend with the 'C' copolymers, i.e. SBR copolymers. The dispersing agents are prepared and present in an amount ranging from about 2 to 50%, preferably 5–35%, and most preferably 10–25% by weight of the total weight of the dispersion copolymer which includes the dispersing agent and the subsequently formed 'C' copolymer, i.e. SBR copolymer.

The catalyst systems are anionic initiators for use in preparing the SBR copolymers and the dispersing agent, preferably any organolithium catalyst which is known in the art as being useful in the polymerization of vinyl aromatic hydrocarbons and conjugated dienes. Suitable catalysts which initiate polymerization of the monomer system and dispersing agent include organolithium catalysts which have the formula $R(Li)_x$ where R represents a hydrocarbyl radical of 1 to 20, preferably 2–8, carbon atoms per R group, and x is an integer of 1–4, preferably 1 or 2. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl n-octyl, n-decyl, cyclopentyl-methyl, cyclohexyl-ethyl, cyclopentyl-thyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, iso-propylcyclohexyl, and the like.

Specific examples of other suitable lithium catalyst include: phenyllithium, naphthyllithium, 4-butylphenyllithium, p-tolyllithium, 4-phenylbutyllithium; 4-butyl-cyclohexyllithium, 4-cyclohexylbutyllithium, 1,4-dilithiobutane, 1,10-dilithio-decane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicoxane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_x$. The preferred lithium catalyst for use in the present invention is n-butyllithium.

Other lithium catalysts which can be employed are lithium dialkyl amines, lithium dialkyl phosphines, lithium alkyl aryl phosphines, lithium diaryl phosphines and trialkyl tin lithium such as tributyl-tin-lithium.

Anionic initiators are typically charged in amounts ranging from 0.2 millimoles to 20 millimoles of anionic initiator per hundred grams of total monomer into the reaction vessels.

All amounts of anionic initiator are indicated by hundred grams of monomer or by ratio of components in the instant invention and are considered to be catalytically effective amounts, that is, effective amounts for initiating and conducting polymerization of the blocks of the dispersing agent and the disclosed monomer systems to produce copolymers of the present invention.

It is preferred to utilize 0.5 to 200 mmoles of the anionic initiator per hundred grams of monomer to prepare the initial "A" block of the dispersing agent in a first reaction vessel. A second stream of 0.2 to 20 mmoles of initiator, is then added during the charging of the monomers to simultaneously produce the "B" block of the dispersing agent and the 'C' copolymer from vinyl aromatic monomers and conjugated diene monomers. It is preferable to use 10 to 50 percent by weight of the total anionic initiator in the preparation of the "A" block, and the remaining 50 to 90 percent by weight is charged during the in-situ preparation of the "B" block and 'C' copolymers.

A SBR copolymer randomizing agent such as an ether or an amine is preferably added to the SBR dispersion polymerization system as part of the catalyst system in an amount effective to promote random copolymerization of the styrene and butadiene monomers. Other suitable randomizing agents are well known in the art such as sodium or potassium alkoxides. Randomizing agents are employed in the polymerization system in amounts generally ranging from a molar ratio of 1:100 to 4:1 of randomizing agent to anionic initiator.

Modifying agents such as ethers, tertiary amines, chelating ethers or amines, and sodium or potassium alkoxides or alkyls, may be added to increase the 1,2-addition reaction of the diene monomer in the SBR. Such modifying agents are well known in the art, such as oligomeric oxolanyl propane, tetrahydrofuran, tetramethylethylene diamine, diethylether and the like, and these modifying agents may be employed in amounts generally ranging from 1:10 to 100:1 molar ratio of the modifier to anionic initiator. The 1,2-addition product can be increased from the 5–15% range to as high as 90% of the diene monomer units being incorporated into the "A" or "B" block of the dispersing agent and the 'C' copolymer.

The preferred 1,2-vinyl content of the "B" block and the 'C' copolymer, i.e. SBR produced in accordance with the process of the instant invention, ranges between 15 to 65% of the diene monomer contributed units. The 1,2-vinyl content in the diene contributed units of the "B" block of the dispersing agent is thus identical to the desired final 1,2-vinyl content of the 'C' copolymer being produced herein.

FIG. 1 is a schematic diagram showing an example of a process suitable for continuous non-aqueous dispersion polymerization according to the present invention. In FIG. 1, a first vinyl aromatic monomer stream 1, a first conjugated diene monomer stream 2, a first solvent stream 3 containing an anionic initiator, and a modifier stream 4 are continuously charged into a first polymerization reaction vessel 5.

The reactant streams continuously charged into the first reaction vessel are preferably an aliphatic hydrocarbon solvent stream such as hexane, an anionic initiator stream such as n-butyl lithium in hexane, a modifier stream such as oligomeric oxolanyl propane in hexane, a diene monomer stream such as butadiene in hexane, a vinyl aromatic stream such as styrene in hexane.

Polymerized "A" block of a dispersing agent in solvent passes from vessel 5 through line 9 into a second polymerization vessel 11. Also continuously charged into the second polymerization vessel 11 are a second vinyl aromatic monomer stream 15, a second conjugated diene stream 17, a second solvent stream 19 containing an anionic initiator, and optionally a modifier stream. A dispersing agent A-B or B-A-B is continuously formed in-situ in vessel 11 as is a product 'C' copolymer. A mixture of product copolymer and dispersing agent exits vessel 11 via line 12 for further treatment with a polymerization stopper and solvent separation. During the course of the polymerization it will generally be desirable to provide some form of agitation to the reaction vessels 5 and 11 such as stirring. A randomizing agent and/or a modifying agent may be added to the first and/or second reactor in combination with the anionic initiator. Different or mixtures of different initiators, modifiers or randomizing agents may be added to the first and second reactors.

The reactant streams continuously charged into the second reaction vessel are preferably a liquid non-aqueous dispersion medium such as hexane, the living "A" block of a dispersing agent from the first reaction vessel, a diene monomer stream such as butadiene in hexane and a vinyl aromatic monomer stream such as styrene in hexane, and initiator stream such as n-butyl lithium in hexane. It is understood that the feed stream flow rates into the reactors are manipulated to obtain the desired monomer ratios to prepare the "A" block and the "B" block of the dispersing agent and the "C" copolymer. The continuous polymerization reactions can be run over a temperature range from 32° up to 310° F. Most generally, it is preferred to utilize a reaction temperature from 200° F. to 260° F. which naturally occurs due to the exothermic polymerization reaction. The reactor residence time required in such a continuous polymerization will vary with the reaction temperature, monomer concentration, catalyst system, and catalyst level. Generally, this reactor residence time will vary from about 20 minutes up to 60 minutes. Commonly, it will be preferred to utilize a reactor residence time from about 20 minutes to 45 minutes.

The amount of butadiene and styrene monomers that can be utilized in such a non-aqueous dispersion polymerization reaction mixture can be varied from about 5 to about 50 weight percent by weight based upon the total reaction mixture. It is preferred to have a final polymer concentration ranging from 20 to 35 percent by weight based upon the total reaction mixture exiting from the second reaction vessel.

It is desirable to conduct this polymerization in an oxygen and moisture free environment. For example, it is desirable to sparge the reaction mixture with dry nitrogen and to run the polymerization reactions under a dry nitrogen atmosphere. The pressure in the reaction system during the polymerization generally will be a function of the polymerization temperature, the monomer concentration, and the boiling point of non-aqueous dispersion medium. The polymerization pressure will usually be maintained within the range between 1.0 and 15 atmospheres.

The non-aqueous dispersions formed in this polymerization process have a solids concentration ranging between about 5 to 50 weight percent and are quite fluid thus enabling a continuous polymerization process. This fluidity permits greatly improved heat transfer as compared to the fluidity of solutions of SBR copolymers prepared using solution polymerization techniques. Due to the relative fluidity of these non-aqueous dispersions, both a higher molecular weight polymer can be produced and the concentration of dispersed SBR copolymers in the medium can be increased by 25 to 100% or more over the maximum allowable concentrations in solution polymerization techniques.

The elastomeric SBR copolymer exiting the second reaction vessel can be recovered from the hydrocarbon solvent by steam desolventization or by drum drying techniques thus providing energy savings due to higher solids levels. By proper control of particle size, the polymers can be recovered by filtration or centrifugation techniques.

The recovered copolymer products, depending on their molecular weights and compositions, can be used for a variety of goods such as tires and various rubber molded products.

It is believed that one skilled in the art can, using the preceding description, utilize the present invention to its fullest extent. The following preferred specific embodiments are, therefore, to be construed as merely illustrative of the catalyst system and the polymerization process of the present invention. All percentages identified in the examples are by weight unless otherwise indicated.

A first 6.5 gallon stirred stainless steel reactor is continuously charged with a first stream of a 17 percent solution of styrene in hexane, a second stream of a 20.9 percent solution of butadiene in hexane, a third stream of hexane, a fourth stream of 0.3 mM/cc of n-butyl lithium in hexane, and a fifth stream of 0.02 mM/cc of a randomizing modifier of oligomeric oxolanyl propane (OOPS) in hexane. All streams were fed into the reactor at the rates shown in Table 1. The residence time at start-up in the reactor is approximately 40 minutes to continuously produce the first or "A" block of the dispersing agent.

After start-up a continuous stream of the polymerization product of the first reactor, namely the "A" block of the dispersing agent, is fed into a second 10 gallon stirred stainless steel reactor. Additional streams fed into the second reactor included a 33.2 percent solution of styrene in hexane, a 31.6 percent solution of butadiene in hexane and 0.3 mmoles of n-butyl lithium in hexane. These streams were fed into the second reactor at the rates displayed in Table 1.

The mixture in the second reactor polymerized to form in-situ a dispersing agent and a dispersed styrene butadiene copolymer. The mixture of copolymer and dispersing agent were continuously recovered via a product stream from the second reactor.

TABLE I

|  | cc/hour | grams/hour |
| --- | --- | --- |
| First Reactor Feed Streams | | |
| 17% Styrene solution | 170 | 221 |
| 20.9% Butadiene solution | 1612 | 1610 |
| Hexane | 20980 | 13847 |
| n-Butyl lithium solution | 39 | 20 |
| OOPS solution | 438 | 289 |
| TOTAL | 23239 | 15993 |
| Second Reactor Feed Streams | | |
| 33.2% Styrene solution | 14151 | 9347 |
| 31.6% Butadiene solution | 19182 | 12670 |
| n-Butyl lithium solution | 184 | 122 |
| "A" block from first reactor | 23239 | 15993 |
| TOTAL | 56756 | 38132 |

EXAMPLES 1 TO 5

In accordance with the foregoing procedures the five continuous in-situ dispersions were conducted utilizing the amount of components and the properties of the recovered polymers are displayed in Table 2. Feed rates into the first and second reactors were controlled to maintain the desired levels displayed in Table II.

In Table II the percent "A" Block under Reactor 1 represents the weight percent of "A" Block fed into the second reactor of the total polymer and monomer feed. Thus, the constant composition in the second reactor in Example 1 is 4.9 percent by weight of "A" block and 95.1 percent by weight of the monomer used to form the "B" block and the rubbery copolymer. The percent of initiator shown in Table II under Reactor 1 displays the percentage of total initiator being charged into the second reactor being supplied from the first reactor. An OOPS modifier is directly added only to the first reactor in the molar ratio of modifier to n-butyl lithium initiator identified as MOD/Li, under Reactor 2.

Table II displays the top temperature reached during dispersion polymerization, the percent of solids during polymerization, the residence time in the reactor during polymerization and the percent of conversion of the monomer charge to polymers.

The polymer properties displayed in Table II include the Mooney viscosity (M1/4 at 100° C.), the percent of styrene in the recovered polymer, the percent of block styrene from $^1$H NMR, the percent of vinyl or 1,2-microstructure in the diene monomer contributed units, the $M_n$, the $M_w/M_n$ and the glass transition temperature $T_g$. The percent of block styrene as determined by $^1$H NMR includes all blocks greater than 2–3 styrene units. Block styrene units having greater than 9 to 10 units are generally calculated by subtracting 20 percent from the $^1$H NMR determination.

TABLE II

| Example | 1 | 2 | 3 | 4 | 5 |
| --- | --- | --- | --- | --- | --- |
| REACTOR I | | | | | |
| % "A" BLOCK | 4.9 | 5 | 5 | 6 | 6 |
| % INITIATOR | 22 | 20 | 50 | 35 | 35 |
| MOD/Li | 0.25 | 0.46 | 0.17 | 0.25 | 0.25 |
| REACTOR II | 78 | | | | |
| TOP TEMP °F. | 230 | 245 | 231 | 234 | 239 |
| % SOLIDS | 21 | 20.2 | 21.7 | 20.2 | 21.5 |
| RESIDENCE TIME (MIN) | 40 | 45 | 45 | 45 | 45 |
| % CONVERSION | 98 | N/A | 99.8 | 97.3 | 95.4 |
| POLYMER PROPERTIES | | | | | |
| MOONEY | 52 | 48 | 51 | 86 | 127 |
| % STYRENE | 39.7 | 46.6 | 45.1 | 40 | 38.9 |
| % BLOCK STYRENE | 17.6 | 20.1 | N/A | 10.1 | 12.1 |
| % VINYL | 24.1 | 28 | 24.5 | 22.6 | 24 |
| $M_n$ | 102,200 | 101,300 | 104,000 | 142,100 | 174,700 |
| $M_w/M_n$ | 3.04 | 3.68 | 2.28 | 2.4 | 2.4 |
| $T_g$ °C. | −30.5 | −26.3 | −42.3 | −33 | −34.7 |

We claim:

1. A continuous process to produce a copolymer by a non-aqueous dispersion polymerization process comprising the steps of:
   (a) continuously adding to a first polymerization reactor via feed streams: a first monomer charge containing 75 to 100 percent by weight of a first conjugated diene monomer and 0 to 25 percent by weight of a first vinyl aromatic monomer, an organolithium polymerization initiator and a dispersing medium and polymerizing the monomer charge to form a first block of a dispersing agent soluble in the dispersing medium;
   (b) continuously adding to a second polymerization reactor via feed streams containing the dispersing medium; the first block of the dispersing agent prepared in step (a), a second monomer charge containing 35 to 70 percent by weight of a second vinyl aromatic monomer and 30 to 65 percent by weight of a second conjugated diene monomer, and a catalytically effective amount of the organolithium polymerization initiator and polymerizing the second monomer charge to simultaneously form:
      (i) a second block of the dispersing agent, the second block being insoluble in the dispersing medium and linking with the first block to form the dispersing agent, and
      (ii) a product copolymer comprising 35 to 70 percent by weight of the second vinyl aromatic monomer and 30 to 65 percent by weight of the second conjugated diene monomer, wherein the dispersing agent disperses the product copolymer in the dispersing medium; and
   (c) continuously recovering the dispersed product copolymer and the dispersing agent from the second polymerization reactor.

2. The process according to claim 1 wherein the first block of the dispersing agent comprises about 2 to about 20 percent by weight of the combined weight of the dispersing agent and the product copolymer.

3. The process according to claim 1 in which the dispersing medium comprises an aliphatic alkane.

4. The process according to claim 1 in which the dispersing medium comprises n-hexane.

5. The process according to claim 1 in which the organolithium polymerization initiator is butyl lithium.

6. The process according to claim 1 wherein the first and the second conjugated diene monomers comprise butadiene.

7. The process according to claim 1 wherein the first and the second vinyl aromatic monomer comprise styrene.

8. The process according to claim 1 wherein the organolithium polymerization initiator in step (a) is 10 to 50 percent by weight of the total amount of the organolithium polymerization initiator used in steps (a) and (b).

9. The process according to claim 7 wherein the total amount of organolithium polymerization initiator added to steps (a) and (b) is between about 0.2 mmoles to 20 mmoles per 100 grams of monomer charged into the first and second polymerization reactors.

10. The process according to claim 1 wherein a randomizing agent is continuously added to the first or the second polymerization reactor.

11. The process according to claim 1 wherein a modifying agent is continuously added to the first or second polymerization reaction.

12. A continuous process for preparing a rubbery polymer which comprises the steps of: (a) polymerizing in the presence of an organolithium initiator and a dispersing medium, a continuous first charge of 75 to 100 parts by weight of butadiene and 0 to 25 parts by weight of styrene in a first reactor and at a temperature and under conditions to continuously produce a first polymeric block and (b) continuously transferring the first polymeric block into a second reactor continuously being charged with an organolithium compound, an aliphatic hydrocarbon solvent and a second monomer charge comprising 35 to 70 parts by weight of styrene and 30 to 65 parts by weight of butadiene to produce (i) a second polymeric block attached to the first polymeric block to form a dispersing agent and (ii) a styrene-butadiene copolymer, wherein the dispersing agent disperses the styrene-butadiene copolymer during formation; and continuously recovering the styrene butadiene copolymer as a dispersion from the second reactor.

13. The process according to claim 12 wherein the first block of the dispersing agent comprises about 2 to about 20 percent by weight of the combined weight of the dispersing agent and the product copolymer.

14. The process according to claim 12 in which the dispersing medium comprises an aliphatic alkane.

15. The process according to claim 12 in which the dispersing medium comprises n-hexane.

16. The process according to claim 12 in which the organolithium polymerization initiator is butyl lithium.

17. The process according to claim 12 wherein the organolithium polymerization initiator in step (a) is 10 to 50 percent by weight of the total amount of the organolithium polymerization initiator used in steps (a) and (b).

18. The process according to claim 12 wherein the total amount of organolithium polymerization initiator added to steps (a) and (b) is between about 0.2 mmoles to 20 mmoles per 100 grams of monomer charged into the first and second polymerization reactors.

19. The process according to claim 12 wherein a randomizing agent is continuously added to the first or the second polymerization reactor.

20. The process according to claim 12 wherein a modifying agent is continuously added to the first or second polymerization reaction.

* * * * *